United States Patent [19]
Rocke

[11] 3,742,505
[45] June 26, 1973

[54] IDENTIFICATION OF ELEVATION ANGLE OF ARRIVAL OF MULTIPLE IONOSPHERIC REFLECTIONS
[75] Inventor: Arthur F. Lyle Rocke, Olney, Md.
[73] Assignee: International Telephone and Telegraph Corporation, Nutley, N.J.
[22] Filed: May 27, 1971
[21] Appl. No.: 147,550

[52] U.S. Cl. .............................. 343/113 R, 343/123
[51] Int. Cl. ................................................ G01s 3/46
[58] Field of Search .......... 343/113 R, 123, 100 CS, 343/100 R

[56] References Cited
UNITED STATES PATENTS
2,717,380  9/1955  Brooks, Jr. ...................... 343/113 R
3,036,301  5/1962  Wiesner ........................ 343/100 CS Primary Examiner—Samuel Feinberg
Assistant Examiner—Richard E. Berger
Attorney—C. Cornell Remsen, Jr., Walter J. Baum, Paul W. Hemminger, Charles L. Johnson, Jr., Philip M. Bolton, Edward Goldberg and Menotti J. Lombardi, Jr.

[57] ABSTRACT

This invention relates to a method for measuring the elevation angles of arrival of radio waves including those due to multiple ionospheric reflections. The wave interference of multimode C.W. signals is displayed as a Lissajous figure which contains information concerning elevation angle and relative magnitude of each mode. Any one mode can be removed from the display by the proper height selection of the vertically disposed antenna elements.

8 Claims, 6 Drawing Figures

Patented June 26, 1973

INVENTOR
ARTHUR F. L. ROCKE
BY
Vincent B. Ingrassia
AGENT

HORIZONTALLY POLARIZED FIELD ABOVE A FLAT GROUND-PLANE, DUE TO TWO MODES: $\Delta = 5°$ MAGNITUDE = 1
$\Delta = 35°$ MAGNITUDE = 0.8

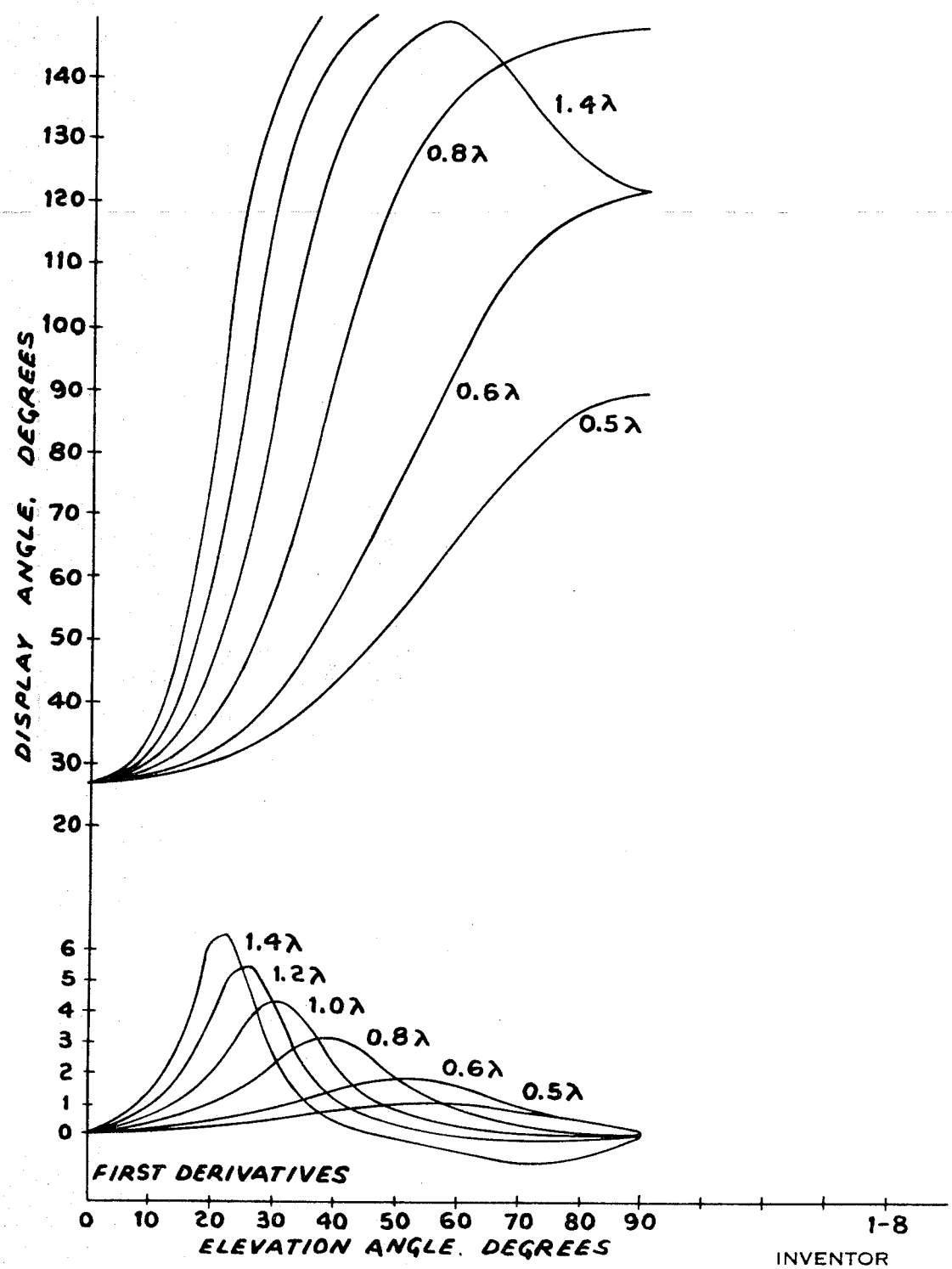

IDENTIFICATION OF ELEVATION ANGLE OF ARRIVAL OF MULTIPLE IONOSPHERIC REFLECTIONS

BACKGROUND OF THE INVENTION

This invention relates to a method of measuring the elevation angle of arrival of radio waves and more particularly, when azimuth is known, to a method for determining the position of the transmitter over a wide range of operating frequencies and ionospheric conditions by making use of the opportunity for vertical triangulation which is presented by the geometry of ionospheric propagation. In this way, the need for cross-bearings from other direction finders to determine range is obviated. Many methods of measuring azimuth are in general use and there are some existing methods of measuring elevation angle of arrival that have been applied to position finding. However, some of these devices have certain limitations that are avoided in the present invention. To perform vertical triangulation, the virtual height of reflection from the ionosphere must be determined by one of several known methods such as CW radar, pulse radar or, having an elevation direction finder, by measuring the elevation angle of arrival of a known transmission and solving the triangle formed by the earth's radius to the direction finder, the angle between this radius and the point of reflection and the angle subtended at the center of the earth by half the known ground range. The virtual height and the measured elevation angle of an unknown transmission can then be applied to a solution for range to that transmitter.

It is well known that a signal may be propagated by reflection from one or more ionosphere layers or by one or more multiple reflections between ionosphere and ground and that CW signals fade periodically and vary in apparent direction of arrival because of the instability of these various paths. Pulse signals, on the other hand, are often designed to avoid this interference and the various modes of propagation are separated by time. Many direction finders operate well on pulse signals but are confused by multimode reception of CW signals. While the present invention operates equally well on pulse signals or on single mode CW signals, it is particularly designed to resolve the arrival angles of multiple mode CW signals. Further, certain existing elevation direction finders operate correctly on a single preferred polarization but give wrong answers when any other polarization predominates. In the present invention the display is independent of polarization. Again, certain existing elevation direction finders depend upon their fixed height above the ground and are in error when drought or flood changes the effective height of ground reflection. This fixed height limits the direction finder to a position of relatively low field strength. In the proposed invention the presence of the ground is essential but the height can be adjusted to the height of optimum field strength. It is possible to make elevation direction finders that have a narrow beam that can be scanned through a range of elevation angles and indicate the angles of the received modes. These direction finders are very large and limited in their application. Most high angle elevation direction finders measure the phase difference between field samples taken in a horizontal plane in the direction of propagation. Low angle elevation direction finders including the present invention, operate by sampling the standing wave that is the result of interference between the direct and ground reflected waves, which is a function of elevation angle and frequency. The magnitude of the field above a good conductor has either a sine or a cosine dependence upon height according to its polarization. The phase is constant with height over a perfect conductor and this allows the magnitude of the standing wave to be compared at different heights without considering phase. On the other hand, when conductivity is not perfect, the solution employed in the present invention is insensitive to the residual phase dependence upon height and is insensitive to the ground conductivity provided that it is uniform.

The relative instability of the various ionospheric paths results in a shift of relative frequency (Doppler shifts) and it will be shown in the description that the interference between the standing waves due to multiple mode reception produces a Lissajous figure in half a Doppler period. The length of the sides of the Lissajous figure are proportional to the magnitudes of each signal component and the directions of the sides are measures of the elevation angles of arrival. Because the magnitude of the standing wave due to a given mode goes to zero at calculable heights, the mean height of the proposed system can be selected to minimize reception of that mode and allow remaining modes to be observed more clearly.

Lissajous figures have been employed for display of azimuthal wave interference but there is no azimuthal equivalent to the nulling techniques here p proposed.

SUMMARY OF THE INVENTION

It is an object of the present invention to provide a method of measuring the elevation angles of arrival of radio waves including those due to multiple ionospheric reflections.

It is a further object of the present invention to provide a method for deriving a Lissajous figure from a vertically disposed array of antenna elements which is acted upon by radio signal including C.W. signals containing at least two modes of propagation.

It is a further object of the present invention to provide a method of interpreting said Lissajous figures in order to determine the angle of arrival of any one particular mode.

According to abroad aspect of the invention there is provided a method for measuring the elevation angle of arrival of a radio wave which has been reflected off the ionshpere comprising receiving said radio wave on a uniformly spaced array divided into three equally spaced subarrays, sampling the outputs of each of said subarrays, summing the outputs of the upper and lower subarrays to provide an output having the same phase as the central array, applying said sum to a first terminal of a two terminal display device, applying the output of the center subarray to the second terminal of said two terminal display device, and displaying the resulting Lissajous Figure, the angle of, which is proportional to the actual angle of arrival.

The above and other objects of the present invention will be more clearly understood from the following detailed description taken in conjunction with the accompanying drawings in which:

BRIEF DESCRIPTION OF THE DRAWINGS

FIG. 5 is a graph for determining actual elevation angle of the arriving mode from the display angle as observed on a CRT.

DESCRIPTION OF THE PREFERRED EMBODIMENT

Figure 1:
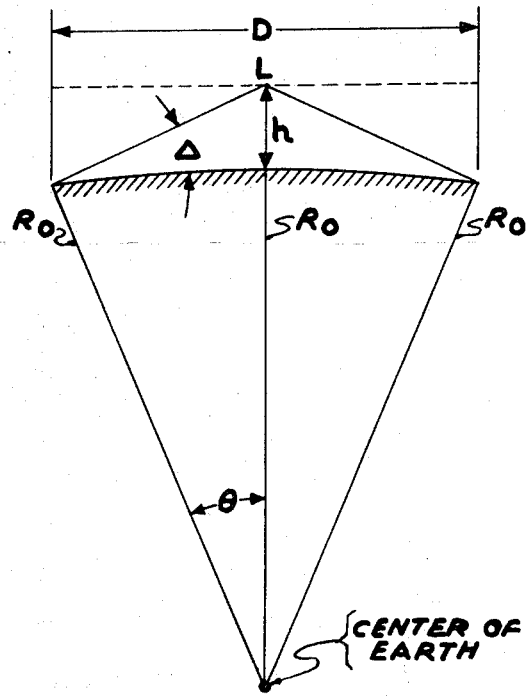
FIG. 1 illustrates the geometry of the angle of arrival method.

FIG. 1 shows two vertical triangles that are often identical, each formed by an earth's radius, $R_o$, and paths from a reflecting point in the ionosphere to the receiver (or transmitter) and to the center of the earth ($R_o+h$). Each triangle forms an angle $\theta$ at the center of the earth and an elevation angle $\Delta$ exists between the horizon and the point of ionospheric reflection. The virtual height of reflection is $h$ and the ground range is $R_g$ $$R_g = 2R_o\theta_{rad}$$

$$\theta = \pi/2 - \Delta - \arcsin(R_o \cos\Delta)/(R_o + h)$$

Figure 2:
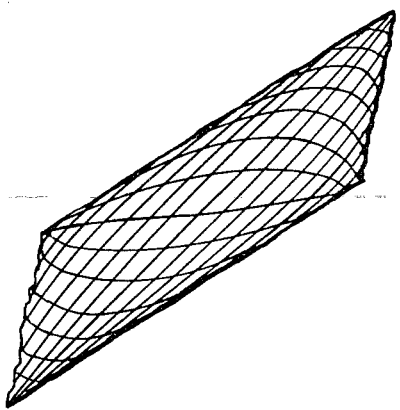
FIG. 2 shows a Lissajous figure resulting from interference between two C.W. modes.

As stated above, due to the relative instabilities of the HF paths a cathode ray tube display of the response of an Instantaneous Elevation Direction Finder (IEDF) to the sum of a number of modes of a C.W. transmission would yield a Lissajous figure containing a measure of the relative magnitudes and elevation angles of the modes. A Lissajous figure resulting from interference between two C.W. modes in a three element IEDF is shown in FIG. 2.

It will be shown that the contribution of each mode goes to zero twice and to a maximum twice, per cycle of doppler shifted frequency. In systems that sample the field above a perfect groundplane the envelope of the figure is a series of straight lines having the relative length and direction of contributing modes. Further, even in an array of limited height, for instance 76 meters, each higher angle mode goes to zero at calculable heights and adjustment to one of these mean heights leaves a display of responses of lower angle modes.

Figure 4:
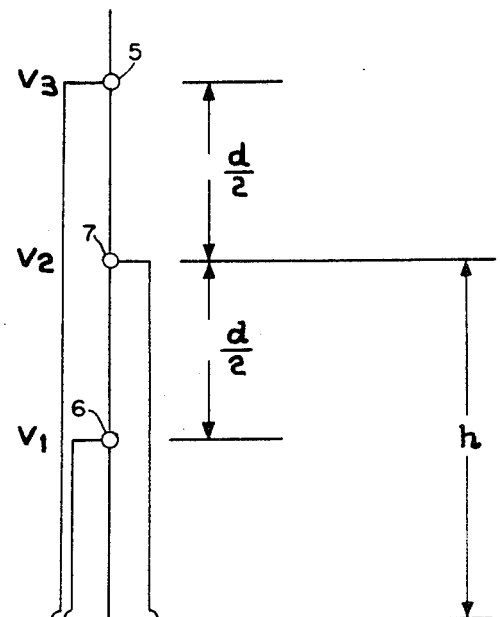
FIG. 4 shows a three element vertically disposed electronic direction finding system.

FIG. 4 shows a three element vertically disposed E.D.F. system which will be taken as an example. Vertical angles of arrival are measured by taking the ratio of the sum of the voltages at upper and lower antennas, 5 and 6 respectively to the voltage at a mid antenna 7 and allowing for frequency.

Assuming three antenna elements, at heights $h - d/2$, $h$ and $h + d/2$ and two modes at angle $\Delta_1$ and $\Delta_2$ and frequencies $\omega_1$ and $\omega_2$, the voltage at each antenna would be $V_1$, $V_2$, and $V_3$.

$$V_1 = \sin\left(2\pi \frac{h-\frac{d}{2}}{\lambda} \sin\Delta_1\right) \sin\omega_1 t$$

$$+ A \sin\left(2\pi \frac{h-\frac{d}{2}}{\lambda} \sin\Delta_2\right) \sin\omega_2(t+\delta t)$$

$$V_2 = \sin\left(2\pi \frac{h}{\lambda} \sin\Delta_1\right) \sin\omega_1 t$$

$$+ A \sin\left(2\pi \frac{h}{\lambda} \sin\Delta_2\right) \sin\omega_2(t+\delta t)$$

$$V_3 = \sin\left(2\pi \frac{h+\frac{d}{2}}{\lambda} \sin\Delta_1\right) \sin\omega_1 t$$

$$+ A \sin\left(2\pi \frac{h+\frac{d}{2}}{\lambda} \sin\Delta_2\right) \sin\omega_2(t+\delta t)$$

$\delta t =$ constant   $A =$ another constant

Let $2\pi \frac{h}{\lambda} \sin\Delta_1 = L$   $\pi \frac{d}{\lambda} \sin\Delta_1 = P$   $\omega_1 t = R$ $2\pi \frac{h}{\lambda} \sin\Delta_2 = M$   $\pi \frac{d}{\lambda} \sin\Delta_2 = Q$   $\omega_2(t+\delta t) = S$ then $V_1 = \sin(L - P) \sin R + A \sin(M - Q) \sin S$ $V_2 = \sin L \sin R + A \sin M \sin S$ $V_3 = \sin(L + P) \sin R + A \sin(M + Q) \sin S$ Taking the first terms of $V_1$ and $V_3$ for example, $\sin(L \pm P) \sin R = \sin L \cos P \sin R \pm \cos L \sin P \sin R$ so, taking both terms, $V_1 + V_3 = 2 \sin L \cos P \sin R + 2A \sin M \cos Q \sin S$ In this system we display $V_2/(V_1 + V_3)$ $= (\sin L \sin R + A \sin M \sin S)/(2 \sin L \cos P \sin R + 2 A \sin M \cos Q \sin S)$ $= 1/[2 \cos P + (2 A \sin M \cos Q \sin S/\sin L \sin R)]$ $+$ $1/[2 \cos Q + (2 \sin L \cos P \sin R/A \sin M \sin S)]$ Sin $R$ and sin $S$ are functions of time, and the second terms in the denominators become 0 or $\infty$ as sin $R$ or sin $S = 0$. If the condition sin $R = 0$ was maintained the display would be a straight line of direction $\tan^{-1} 1/2 \cos Q$. This is illustrated in FIG. 2. In practice the display is a spot at the position $-Y = V_2^2 + (V_1 + V_3)^2 \cos\phi_1$   $X = V_2^2 = (V_1 + V_3)^2 \sin\phi_1$ and $\phi_1 = \tan^{-1} 1/2 \cos Q$ Similarly, when sin $S = 0$, the spot has a position $-Y = V_2^2 + (V_1 + V_3)^2 \cos_2$ $X = V_2^2 + (V_1 + V_3)^2 \sin\phi_2$ where $\phi_2 = \tan^{-1} 1/2 \cos P$ This happens twice per cycle of $\omega_1$ and of $107_2$. At other times the spot takes up a position that is the resultant of both terms and the locus of the spot is a Lissajous figure.

Further, the magnitude of the first term goes to zero when sin $L = 0$ and the second term goes to zero when sin $M = 0$.

Sin $L$ and sin $M$ are of the form sin ($2\pi h/\lambda \sin\Delta$) and equal zero when $$2\pi h/\lambda \sin\Delta = (n-1)\pi$$

$$h = (n-1)\lambda/2 \sin\Delta$$

Figure 3:
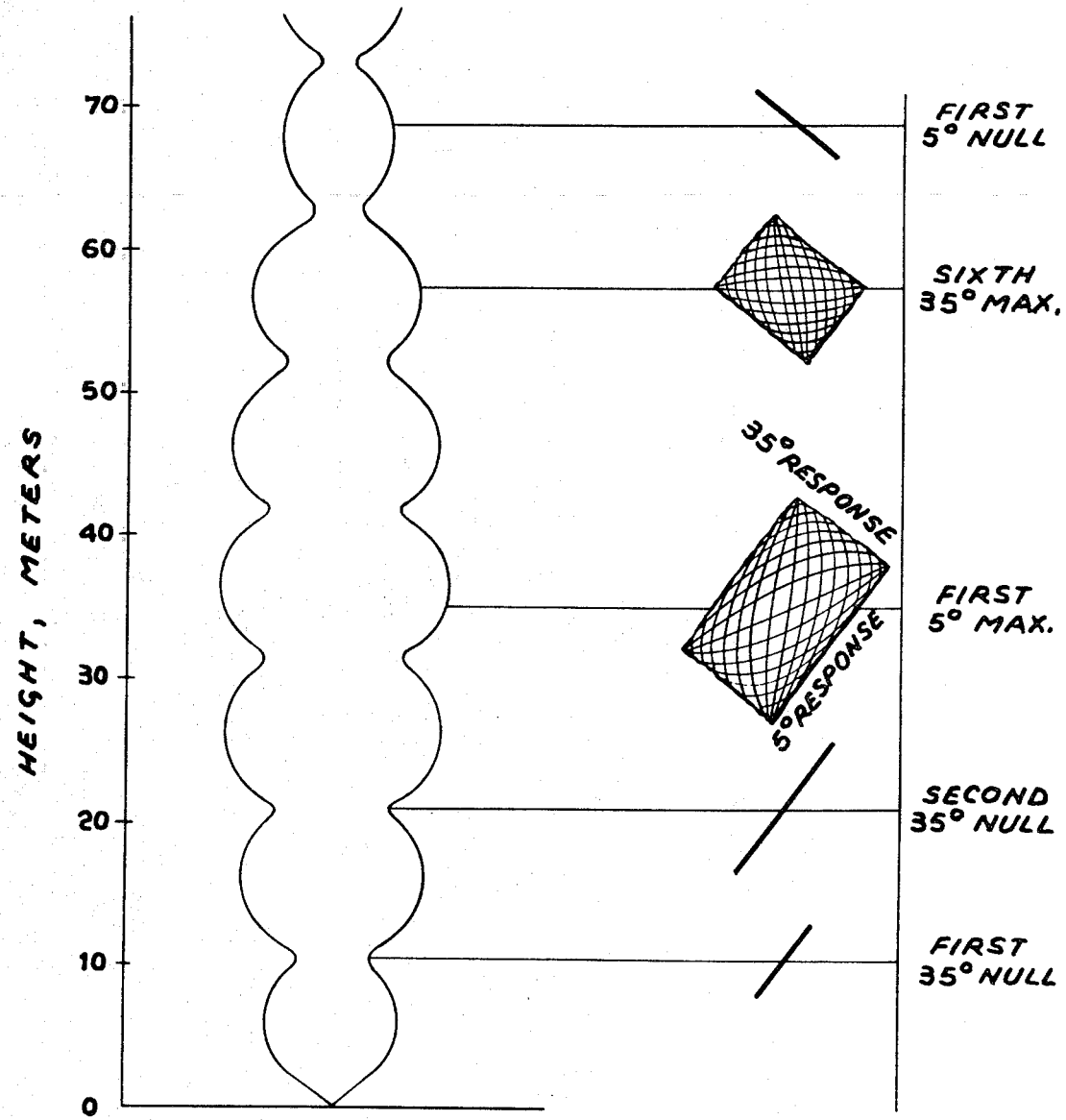
FIG. 3 shows the field above a ground plane at a time when two modes are in phase.

So there are heights at which the first or second terms can be observed alone for all times at which $\lambda$ and $\Delta$ are constant. This is illustrated in FIG. 3 which shows the field above a groundplane at the time when two modes are in phase. Lissajous figures have been plotted at heights at which one or the other mode goes through zero net field, as well as at intermediate points. The important fact to be observed is the constancy of direction of the sides of the figure which is a demonstration of the independence of the display angle upon height.

Another important fact is that the higher elevation angle goes through 7 nulls in the specified height (at 25 Mc/s) where the 5° wave field strength only goes to zero near the top of the tower. At a slightly lower frequency there would be no nulls for a 5° elevation angle. Thus, steering to a magnitude null in a practical system permits the observations of lower angle modes. If the signal is frequency modulated, or if height is scanned, the magnitude of each mode response will be function of time, going to zero in accordance with this expression.

The display of a wideband signal will be a fan with a sharp null at the angle and frequency that satisfy the above equations. The frequency can be identified by superimposing a reference signal and observing beats. If the equation is not satisfied by any part of the signal spectrum, the height must be increased. If $\lambda$, $n$ and mean height are accurately known, an accurate value of $\Delta$ can be derived. Of course, a wideband signal is accompanied by all the other signals in the passband and identification by its fan shape may be difficult. However, if the receiver bandwidth is reduced and its center frequency is scanned over the signal spectrum, the correlation with the fan display should be observed. If the signal occupies a narrow spectrum, a very narrow band receiver can be used because the bandwidth need pass only the Doppler modulations. However, if height is scanned, the bandwidth should be adjusted to admit this new modulation.

As stated earlier, interference between the direct and ground reflected waves of a horizontally polarized signal, arriving at an elevation angle $\Delta$ degrees above a perfect groundplane, leads to a standing wave in the vertical plane of magnitude $2jE_1 \sin(2\pi h/\lambda \sin \Delta)$, the time phase being independent of height and of elevation angle.

Direct and ground reflected noise impulses arriving in the same manner also add coherently and assume the same distribution.

Similarly, vertically polarized signals and noise impulses produce standing waves of the form $2E_1 \cos\Delta\cos(2\pi h/\lambda \sin \Delta)$ and retain their initial relative time phases.

It can be shown that three modes and, presumably, $n$ modes, result in three terms, or $n$ terms which go to zero twice per cycle of $\omega_1\omega_2\omega_3$ or $\omega_n$. The loci of these zeros, again are straight lines as long as the conditions are unchanged. With a system of limited height, there will be no nulls in response to signals of low elevation angles of any frequency, and there is a low frequency limit at which a null can be observed at the top of the system at a given elevation angle. Thus the null is regarded as a very desirable feature in the observation of the parameters of a wideband signal, or as a means of eliminating the contribution of a high angle mode while facilitating measurement of low elevation angle modes by direct observation. The lack of height selectability requires all modes to be present in the Lissajous figure but this is not necessarily bad because the dominant modes are the most easily observed.

FIG. 5, shows the correlation of display angle as observed on a CRT with the actual elevation angle of the arriving mode.

A vertically disposed antenna array for carrying out the inventive method employs identical antennas that can have any polarization if the $n$ antennas are equally spaced $\lambda min/2$ in the vertical plane and the lowest antenna is at least $\lambda max/5$ meters from the ground to insure impedance uniformity). There exists a signal-to-noise advantage by concentration of the response into a wanted vertical direction because all antennas are used all the time. Also, the antenna grouping produces identical calibrations over contiguous octaves, and with the appropriate antenna elements, the system is independent of polarization.

The low frequency limit is reached when the spacing between the centers of the upper and lower antenna groups equals $\lambda/2$. The high frequency limit is reached when the spacing between neighboring elements equals $\lambda/2$.

If the voltages $V_1 + V_3$ derived from the upper and lower antenna groups is fed to the y plate of an oscilloscope, 10 via summer 8 and phase shifter 9 and if a voltage derived from the center antenna group is applied to the x plates of an oscilloscope 10 the resulting display will be a Lissajous figure representative of the interference between C.W. modes.

Three elements provide a greater than 2:1 useful frequency range with a tower height two times the mean wavelength (8-16 Mc/s, 125 feet). Six antenna elements connected one way cover a 2:1 upper frequency range and in an alternative connection, a contiguous 2:1 lower frequency range with a tower height of four times the mean wavelength.

The same principle can be used to extend the range by other factors of two so that twelve elements could cover an additional 2:1 lower range in a system of twice the height, or an additional 2:1 upper range without change of height. The latter option permits coverage from 4-32 Mc/s with a 250 feet tower or, adding another octave 2-32 Mc/s with a 500 foot tower and 24 elements.

The lower frequency connections provide enhanced low angle discrimination at the higher frequencies when the possible ambiguities can be tolerated.

The response of each group is proportional to the magnitude of the standing wave at its mean height and this could be a null. Switching the antennas up or down $\lambda/2 \cos \theta$ would change this to a maximum without a change of calibration between display angle and the actual elevation angle of the receiving signal.

Figure 6:
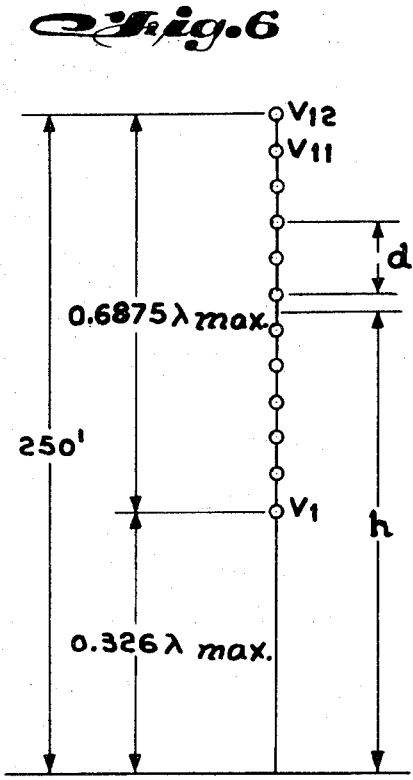
FIG. 6 shows a 12 element vertically disposed antenna array for receiving multimode ionospheric reflections.

FIG. 6 shows a 12 element system suited to the frequency range 4-32 Mc/s. The range is divided naturally into octaves: 4-8, 8-16, 16-32 and the same calibration curves apply to each octave.

It can be seen that for n antenna elements, $\tan \Psi = 1/[2 \cos(2n \phi/3)]$ that the entire aperture can be filled with 3 groups of equally spaced elements without effecting calibration. The elements in each group may then be switched on and off to vary the mean height mode to eliminate certain modes from the display.

It is to be understood that the foregoing description of specific examples of this invention is made by way of example only and is not to be considered as a limitation on its scope.

I claim:

1. A method for measuring the elevation angle of arrival of a radio wave which has been reflected off the ionosphere comprising:
   receiving said radio wave on a uniformly spaced array of identical elements disposed in the vertical direction over a ground plane, said uniformly spaced array divided into three equally spaced subarrays;
   sampling the outputs of each of said subarrays;
   summing the outputs of the upper and lower subarrays to provide an output having the same phase as the central array;
   applying said sum to a first terminal of a two terminal display device;

applying the output of the center subarray to the second terminal of said two terminal display device; and displaying the resulting image, the angle of which is proportional to the actual angle of arrival.

2. A method for measuring the elevation angle of arrival of multimode ionospheric reflections of radio waves comprising:

receiving said radio waves on a uniformly spaced array of identical elements disposed in a vertical direction over a ground plane, said uniformly spaced array divided into three equally spaced subarrays;

sampling the outputs of each of said subarrays;

summing the amplitude of the upper and lower subarrays to provide an output having the same phase as the central array;

applying said sum to a first terminal of a two terminal display device;

applying the output of the center subarray to a second terminal of said two terminal display device;

changing the mean height of said subarrays to eliminate interference on said display due to the reception of unwanted modes; and displaying the resulting image, the angle of which is proportional to the actual angle of arrival.

3. A method for measuring the elevation angle of arrival of a radio wave which has been reflected off the ionosphere according to claim 2 further comprising the step of selecting the spacing between the upper and lower subarrays to optimize angle discrimination of the received ionospheric reflections.

4. A method for measuring the elevation angle of arrival of a radio wave which has been reflected off the ionosphere according to claim 2 wherein said display is a Lissajous figure due to interference between multiple C.W. modes.

5. A method for measuring the elevation angle of arrival of a radio wave which has been reflected off the ionosphere according to claim 4 wherein the sides of said Lissajous figure have an angle which is proportional to the angle of arrival of one of the modes contributing to the interference.

6. A method for measuring the elevation angle of arrival of a radio wave which has been reflected off the ionosphere according to claim 1 wherein said array of identical elements disposed in the vertical direction comprises n antennas equally spaced $\lambda min/2$ from each other and wherein the lowest element in said vertically disposed array is at least $\lambda max/5$ from the ground to ensure impedance uniformity.

7. A method for measuring the elevation angle of arrival of a radio wave which has been reflected off the ionosphere according to claim 1 wherein said antenna array is horizontally polarized.

8. A method for measuring the elevation angle of arrival of a radio wave which has been reflected off the ionosphere according to claim 1 wherein said antenna array is vertically polarized.

* * * * *